United States Patent [19]

Takano et al.

[11] Patent Number: 5,686,181
[45] Date of Patent: Nov. 11, 1997

[54] CARBON FIBERS FOR REINFORCEMENT OF CEMENT AND CEMENT COMPOSITE MATERIAL

[75] Inventors: Katsumi Takano; Yasushi Katsuta; Hideyuki Nakajima; Yoshikazu Nagata, all of Ibaraki-ken; Sadatoshi Ohno, Chiba-ken; Tadahiro Kakizawa, Chiba-ken; Toshio Yonezawa, Chiba-ken; Junichi Ida; Masaki Iwata, both of Nagoya, all of Japan

[73] Assignees: Petoca, Ltd., Tokyo; Takenaka Corporation, Osaka, both of Japan

[21] Appl. No.: 502,599

[22] Filed: Jul. 14, 1995

Related U.S. Application Data

[63] Continuation of Ser. No. 155,847, Nov. 23, 1993, abandoned.

[30] Foreign Application Priority Data

Nov. 27, 1992 [JP] Japan ................. 4-318302
Nov. 27, 1992 [JP] Japan ................. 4-318303
Nov. 27, 1992 [JP] Japan ................. 4-318304

[51] Int. Cl.$^6$ ............................. D04H 1/58; B32B 9/00
[52] U.S. Cl. ........................... 428/367; 428/408; 428/413
[58] Field of Search ................................. 428/288, 367, 428/408, 413

[56] References Cited

U.S. PATENT DOCUMENTS

| | | |
|---|---|---|
| 4,420,512 | 12/1983 | Ogawa et al. ................. 427/386 |
| 4,751,258 | 6/1988 | Minami . |
| 4,904,818 | 2/1990 | Minami et al. ................. 560/85 |
| 5,062,897 | 11/1991 | Katsumata et al. ............. 106/696 |
| 5,334,419 | 8/1994 | Minami et al. ................. 427/386 |

FOREIGN PATENT DOCUMENTS 2 368 571  5/1978  France .

OTHER PUBLICATIONS

Chemical Abstracts, vol. 117, No. 10, Sep. 7, 1992, AN 96339a, F.Nakao, et al., "Carbon Fiber for Reinforcement of Cement".

Primary Examiner—Helen Lee
Attorney, Agent, or Firm—Oblon, Spivak, McClelland, Maier & Neustadt, P.C.

[57] ABSTRACT

There are here disclosed carbon fibers for reinforcement of cement which are obtained by applying, onto the surfaces of carbon fibers, esters of oleic acid and aliphatic monovalent alcohols, esters of oleyl alcohol and monovalent fatty acids, polyoxyalkylene bisphenol ethers or polyether esters as sizing agents, and a cement composite material having a bending strength of 300 kgf/cm$^2$ or more which contains cut carbon fibers having a fiber length of 10 to 50 mm at a mixing volume ratio of the cut carbon fibers to the cement matrix in the range of 1 to 5%. According to the present invention, there are provided the carbon fibers for reinforcement of cement which have excellent adhesive properties to the cement, good process passage properties through a direct spray gun and good bundling properties and which are suitable for a direct spray method, and the cement composite material using the carbon fibers and having high bending strength.

4 Claims, No Drawings

CARBON FIBERS FOR REINFORCEMENT OF CEMENT AND CEMENT COMPOSITE MATERIAL

This application is a Continuation of application Ser. No. 08/155,847, filed on Nov. 23, 1993, now abandoned.

BACKGROUND OF THE INVENTION

1. Field of the Invention

The present invention relates to carbon fibers for reinforcement of cement and a cement composite material using the carbon fibers. More specifically, the present invention relates to carbon fibers for reinforcement of cement which have excellent adhesive properties to the cement, good process passage properties through a direct spray gun and good bundling properties and which are particularly suitable for a direct spray method, and a cement composite material using the above-mentioned carbon fibers and having high bending strength.

2. Description of the Related Arts

In recent years, carbon fibers have been used not only as materials in various fields of, for example, airplane parts, automobile parts, sporting goods and the like, but also as reinforcement materials for resins and cements, because of having excellent features such as high strength, high modulus of elasticity and light weight. Thus, the demand of the carbon fibers has been remarkably increased.

Furthermore, kneaded materials of hydraulic cement powders have been widely used as various building materials and civil engineering materials. In order to reinforce such a kneaded material and to prevent the occurrence of cracks, it has been heretofore attempted to blend a fibrous material with the kneaded material. However, the employment of asbestos is not preferable, because the asbestos is a carcinogen. In addition, glass fibers are poor in alkali resistance, so that the strength of the glass fibers themselves inconveniently deteriorates in the cement. Thus, various kinds of organic fibers and alkali-resistant glass fibers are instead used as the reinforcement materials. However, the organic fibers are poor in fire resistance, and even in the case of the alkali-resistant glass fibers, the strength of the kneaded material declines, when these fibers are used for a long period of time under alkaline circumstances of the cement or the like. Hence, much attention is now paid to carbon fibers having excellent heat resistance and excellent chemical resistance as well as high strength and high modulus of elasticity.

However, when added to and mixed with the cement, the carbon fibers are poorer in adhesive properties (or stickiness) to the cement as compared with the asbestos and the glass fibers, and therefore there is the problem that they cannot exert a sufficient effect as the reinforcement material. Accordingly, various contrivances have been made in order to increase the adhesive properties of the carbon fibers to the cement and to thereby heighten the strength of the resultant carbon fibers-reinforced cement material. For example, there have been suggested a method in which carbon fiber strands impregnated with a hydrophobic liquid resin such as an epoxy resin are stretched in cement, and the resin and the cement are then simultaneously hardened (Japanese Patent Publication No. 19620/1983), a method in which carbon fibers mutually bound by a water-soluble binder such as methyl cellulose are arranged in one direction or two crossable directions in cement (Japanese Patent Application Laid-open No. 129657/1981), a method in which cement slurry layers are superposed upon each other with the interposition of a carbon fiber sheet including a water-soluble synthetic resin emulsion such as an acrylic emulsion (Japanese Patent Application Laid-open No. 223659/1983), a method in which in manufacturing a reinforced cement material by a hacek manufacturing method, a nonionic or a cationic high polymeric coagulant such as a polyalkylamino acrylate is applied onto the surfaces of fibers (Japanese Patent Application Laid-open No. 81052/1985), and a fibrous material for cement reinforcement in which a cationic rubber latex is applied onto the surfaces of carbon fibers (Japanese Patent Application Laid-open No. 108755/1987).

In these conventional techniques, however, restriction is put on the morphology of the carbon fibers to be used and a construction method to be selected, and the kind of cement to be used is limited. In addition, they have the problem that the adhesive properties to cement are not sufficient. For these reasons, the conventional techniques are not always sufficiently satisfactory.

In recent years, in the manufacture of a concrete composite material containing a certain kind of fibers as a reinforcement material, a direct spray method in which longer fibers (25 to 30 mmor more) can be used and which can sufficiently exert dynamic characteristics has been noticed and put to practical use by the utilization of glass fibers. Furthermore, it has also been suggested that pitch-based carbon fibers, in which bundling properties are enhanced by the use of a special bundling agent in a fiber manufacturing process, are applied to the direct spray method (Japanese Patent Application Laid-open No. 30008/1987), but since the manufacturing process and the morphology of the carbon fibers are limited, this suggested technique cannot be applied to the generic field of the carbon fibers. In the case that this direct spray method is applied, it is important that the carbon fibers for reinforcement are excellent in adhesive properties to cement, and that they have good process passage properties through a direct spray gun, i.e., friction between the carbon fibers and metals is so low as to make the carbon fibers easily slidable.

SUMMARY OF THE INVENTION

In view of the above-mentioned situations, the present invention has been achieved. An object of the present invention is to provide carbon fibers for reinforcement of cement which have excellent adhesive properties to the cement, good process passage properties through a direct spray gun and good bundling properties and which are particularly suitable for a direct spray method. Another object of the present invention is to provide a cement composite material using the above-mentioned carbon fibers and having high bending strength.

The present inventors have intensively conducted researches to achieve the above-mentioned objects, and as a result, they have found that when specific sizing agents are applied onto the surfaces of carbon fibers, carbon fibers for reinforcement of cement can be obtained which have excellent adhesive properties to the cement, good process passage properties through a direct spray gun and good bundling properties, and a cement composite material containing the carbon fibers having a specific length in a specific mixing ratio has high modulus in bending. The present invention has been attained on the basis of such knowledges.

That is, the present invention provides carbon fibers for reinforcement of cement which are obtained by applying, onto the surfaces of carbon fibers, a sizing agent comprising at least one selected from the group consisting of esters of oleic acid and aliphatic monovalent alcohols, esters of oleyl alcohol and monovalent fatty acids, polyoxyalkylene bisphenol ethers and polyether esters. Furthermore, the present invention also provides a cement composite material having a bending strength of 300 kgf/cm$^2$ or more which contains cut carbon fibers having a fiber length of 10 to 50 mm at a mixing volume ratio of the cut carbon fibers to the cement matrix in the range of 1 to 5%.

DESCRIPTION OF THE PREFERRED EMBODIMENTS

In the present invention, examples of usable carbon fibers include pitch-based, PAN-based and rayon-based carbon fibers, and the carbon fibers having a tensile strength of 150 kgf/mm$^2$ or more and a modulus in tension of $10 \times 10^3$ kgf/mm$^2$ or more can be preferably prepared by spinning, infusibilization, carbonization and graphitization in accordance with a known procedure. Furthermore, mesophase pitch-based carbon fibers which can easily attain high modulus of elasticity considering a cost can also be particularly preferably used.

In the present invention, a sizing agent is applied on the surface of the above-mentioned carbon fibers. This sizing agent may be directly applied onto the surfaces of the carbon fibers, or alternatively, if desired, the application of the sizing agent may be done after the treatment of the surfaces of the carbon fibers in a known manner such as a liquid phase oxidizing method using an oxidizing agent, a heat cleaning method, a gaseous phase oxidizing method, a whiskerising method or an electrolytic oxidizing method.

As the sizing agent, there is used at least one selected from the group consisting of esters of oleic acid and aliphatic monovalent alcohols, esters of oleyl alcohol and monovalent fatty acids, polyoxyalkylene bisphenol ethers and polyether esters. Examples of the esters of oleic acid and aliphatic monovalent alcohols include oleyl oleate, stearyl oleate, lauryl oleate, octyl oleate, 2-ethylhexyl oleate and isotridecyl oleate. Examples of the esters of oleyl alcohol and monovalent fatty acids include oleyl stearate, oleyl palmitate, oleyl laurate, oleyl isestearate and oleyl octanoate. Typical examples of the polyoxyalkylene bisphenol ethers include polyoxyethylene bisphenol ethers represented by the formula

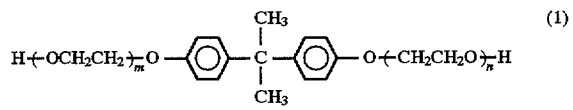

(1)

wherein each of m and n is an integer of 1 to 29, and m+n=30.

Furthermore, a preferable example of the polyether esters can be obtained by polycondensation reaction of a dicarboxylic acid component and a glycol component in the presence of a catalyst. A typical example of this polyether ester is what is formed by the polycondensation reaction of dimethyl terephthalate, ethylene glycol adipate and ethylene glycol. These sizing agents may be used singly or in combination of two or more thereof.

No particular restriction is put on the application technique of the above-mentioned sizing agents. First, the sizing agent is dissolved in a suitable solvent or emulsified in an aqueous medium to prepare a solution or an emulsion, and strands of the carbon fibers are then brought into direct contact with or immersed in the thus prepared solution or emulsion. Afterward, the solvent is removed by a conventional known means such as hot-air drying, infrared drying or microwave drying to cover the surfaces of the carbon fibers with the sizing agent. The amount of the sizing agent to be applied is suitably in the range of 0.5 to 10% by weight based on the weight of the carbon fibers. If this amount is less than 0.5% by weight, the effect of the present invention cannot be sufficiently exerted, and if it is more than 10% by weight, bundling is excessively strengthened, so that a dispersion degree of the carbon fibers in cement is low and the physical properties of a cement composite material tend to decline.

The number of monofilaments constituting a bundle of the thus treated carbon fibers is in the range of 30 to 12,000, preferably 50 to 6,000. If the number of the monofilaments per strand is less than 30, the productivity of the fiber bundles is noticeably poor, and if it is more than 12,000, it is difficult to bundle the monofilaments into one, and the dispersibility of them in the cement is poor.

The thus obtained carbon fibers for reinforcement of cement have excellent adhesive properties to the cement and less friction to metals, and hence they are easily slidable, so that the process passage properties of the carbon fibers through the direct spray gun are good. In addition, they are excellent in bundling properties, and particularly the carbon fibers are suitable for the direct spray method.

The cement composite material of the present invention is obtained by cutting the above-mentioned carbon fibers for reinforcement of cement into a fiber length of 10 to 50 mm, and mixing the cut carbon fibers with a cement matrix at a mixing volume ratio of the cut carbon fibers to the cement matrix in the range of 1 to 5%. No particular restriction is not put on a cutting technique of the carbon fibers, and for example, the cutting operation can be carried out by the use of a guillotine type cutter, a roving cutter or a nozzle gun for the direct spray.

If the fiber length is less than 10 mm, the dispersibility of the carbon fibers is good at the time of the mixing with the cement, but a sufficient reinforcement performance cannot be obtained. Conversely, if it is more than 50 mm, the reinforcing properties can be obtained, but the dispersibility is poor, so that uniform products can scarcely be obtained. Furthermore, if the mixing volume ratio of the carbon fibers to the cement matrix is less than 1%, the reinforcing effect of the carbon fibers is not sufficiently exerted, and if it is more than 5%, unpreferable situations are brought about. For example, the mixing of the carbon fibers is difficult, and the uniform dispersion cannot be achieved.

No particular restriction is put on a process for mixing the carbon fibers with the cement and then molding the cement composite material, and various conventional techniques such as a direct spray method or a premixing method can be used. In the present invention, the direct spray method can be particularly suitably used. This direct spray method comprises spraying the carbon fibers through a nozzle of a compressed air gun, while the rovings of the carbon fibers are continuously cut, and simultaneously spraying a cement slurry through another nozzle for molding.

No particular restriction is put on the cement slurry which can be used in this process, and there can be employed any cement slurry which has been heretofore used in the manufacture of the conventional carbon fibers-reinforced cement composite material. An example of the cement slurry is a mixed slurry formed by blending a hydraulic cement such as portland cement, blast furnace cement or aluminous cement with an aggregate such as sand, siliceous sand, perlite, vermiculite, sirasu balloon, fly ash or microfine silica and admixtures such as a dispersant, a water reducing agent and an anti-foaming agent; adding water thereto; and then mixing them.

Blending ratios such as a water/cement ratio and an aggregate/cement ratio in the slurry are suitably selected in compliance with the morphology of the carbon fibers to be used, and the moldability and the construction properties of the cement composite material to be manufactured. Afterward, the thus obtained unhardened molded article can be cured and set by a process such as water-curing, gas-curing or vapor-curing to manufacture a desired carbon fibers-reinforced cement composite material.

The thus obtained cement composite material of the present invention has a high bending strength of 300 kgf/cm$^2$ or more, and hence it can be suitably used in various applications in building and civil engineering fields.

Next, the present invention will be described in more detail in reference to examples.

EXAMPLE 1

An aqueous emulsion solution containing stearyl oleate at a concentration of 4% by weight was prepared, and strands each consisting of 2,000 monofilaments of mesophase pitch-based carbon fibers having a modulus in tension of 21×10$^3$ kgf/mm$^2$ and a tensile strength of 216 kgf/mm$^2$ were immersed in the above-mentioned solution, followed by drying, to prepare the carbon fibers for reinforcement of cement to which stearyl oleate was applied in an amount of 1.0% by weight.

On the other hand, a cement mortar was prepared which had a cement/sand weight ratio of 1.33, a water/cement weight ratio of 0.35 and a cement admixture/cement weight ratio of 0.008.

By the use of a spray gun for a direct spray method, the carbon fibers for reinforcement of cement were sprayed simultaneously with the cement mortar, while the bundle of the carbon fibers was cut into a length of 25 mm, to obtain a molded article of the carbon fibers-reinforced cement concrete. In this case, the feed of the carbon fibers was adjusted so as to be 3% by volume.

This molded article was cut into specimens for a bending test having a length of 250 mm, a width of 50 mm and a thickness of 10 mm at an age of seven days at room temperature, and a three-point bending test was made, a distance between supports being 200 mm. As a result, the bending strength was 325 kgf/cm$^2$. In addition, the same molded article was subjected to the same test at an age of 28 days at room temperature, and as a result, the bending strength was 345 kgf/cm$^2$.

EXAMPLE 2

The same procedure as in Example 1 was carried out except that stearyl oleate was replaced with oleyl stearate.

As a result, the bending strength of the resultant molded article at an age of 7 days at room temperature was 310 kgf/cm$^2$, and that of the molded article at an age of 28 days at a room temperature was 327 kgf/cm$^2$.

EXAMPLE 3

An aqueous emulsion solution containing an adduct of ethylene oxide with bisphenol A having a molecular weight of 1,500 at a concentration of 4% by weight was prepared, and strands each consisting of 2,000 monofilaments of mesophase pitch-based carbon fibers having a modulus in tension of 21×10$^3$ kgf/mm$^2$ and a tensile strength of 216 kgf/mm$^2$ were immersed in the above-mentioned solution, followed by drying, to prepare the carbon fibers for reinforcement of cement to which the sizing agent was applied in an amount of 1.0% by weight.

On the other hand, a cement mortar was prepared which had a cement/sand weight ratio of 1.33, a water/cement weight ratio of 0.35 and a cement admixture/cement weight ratio of 0.008.

By the use of a spray gun for a direct spray method, the carbon fibers for reinforcement of cement were sprayed simultaneously with the cement mortar, while the bundles of the carbon fibers were cut into a length of 25 mm, to obtain a molded article of the carbon fibers-reinforced cement concrete. In this case, the feed of the carbon fibers was adjusted so as to be 3% by volume.

This molded article was cut into specimens for a bending test having a length of 250 mm, a width of 50 mm and a thickness of 10 mm at an age of seven days at room temperature, and a three-point bending test was made, a distance between supports being 200 mm. As a result, the bending strength was 315.kgf/cm$^2$.

EXAMPLE 4

Polycondensation reaction was carried out between excess ethylene glycol and dimethyl terephthalate (molar ratio=0.20), ethylene glycol adipate (molar ratio=0.78), 5-sulfonsodiumisophthaldimethyl (molar ratio=0.02) and polyethylene glycol (molar ratio=0.15) in the presence of a catalyst to obtain a polyether ester having a molecular weight of 8,000 to 12,000. Afterward, an aqueous emulsion solution containing this polyether ester at a concentration of 2% by weight was prepared, and strands each consisting of 2,000 monofilaments of mesophase pitch-based carbon fibers having a modulus in tension of 21×10$^3$ kgf/mm$^2$ and a tensile strength of 216 kgf/mm$^2$ were immersed in the above-mentioned solution, followed by drying, to prepare the carbon fibers for reinforcement of cement to which the polyether ester was applied in an amount of 1.0% by weight.

On the other hand, a cement mortar was prepared which had a cement/sand weight ratio of 1.33, a water/cement weight ratio of 0.35 and a cement admixture/cement weight ratio of 0.008.

By the use of a spray gun for a direct spray method, the carbon fibers for reinforcement of cement were sprayed simultaneously with the cement mortar, while the bundles of the carbon fibers were cut into a length of 25 mm, to obtain a molded article of the carbon fibers-reinforced cement concrete. In this case, the feed of the carbon fibers was adjusted so as to be 3% by volume.

This molded article was cut into specimens for a bending test having a length of 250 mm, a width of 50 mm and a thickness of 10 mm at an age of seven days at room temperature, and a three-point bending test was made, a distance between supports being 200 mm. As a result, the bending strength was 305 kgf/cm$^2$. In addition, the same molded article was tested at an age of 28 days at room temperature, and as a result, the bending strength was 320 kgf/cm$^2$.

Comparative Example 1

The same strands as in Example 1 each consisting of 2,000 monofilaments of mesophase pitch-based carbon fibers having a modulus in tension of 21×10$^3$ kgf/mm$^2$ and a tensile strength of 216 kgf/mm$^2$ were immersed in an emulsion type epoxy-based sizing agent containing Epicoat 828 and a curing agent SE-11, followed by drying, to prepare the carbon fibers for reinforcement of cement to which the epoxy-based sizing agent was applied in an amount of 1.0% by weight.

On the other hand, a cement mortar was prepared which had a cement/sand weight ratio of 1.33, a water/cement weight ratio of 0.35 and a cement admixture/cement weight ratio of 0.008. Afterward, the same procedure as in Example 1 was carried out.

As a result, the bending strength of the resultant molded article at an age of seven days at room temperature was 187 kgf/cm$^2$.

What is claimed is:

1. Carbon fibers for reinforcement of cement, which are obtained by applying, onto the surfaces of carbon fibers, a sizing agent which is any one of (1) esters of oleic acid and aliphatic monovalent alcohols, or (2) esters of oleyl alcohol and monovalent fatty acids, or (3) a polycondensation product of dimethyl terephthalate, ethylene glycol adipate and ethylene glycol.

2. The carbon fibers of claim 1, wherein said sizing agent is an ester of oleic acid and an aliphatic monovalent alcohol.

3. The carbon fibers of claim 1, wherein said sizing agent is an ester of oleyl alcohol and a monovalent fatty acid.

4. The carbon fibers of claim 1, wherein the amount of said sizing agent is in the range of about 0.5 to 10% by weight based on the weight of the carbon fibers.

* * * * *